F. A. GROVES.
COLLECTION AND RECORDING OF FARES.
APPLICATION FILED AUG. 11, 1917.

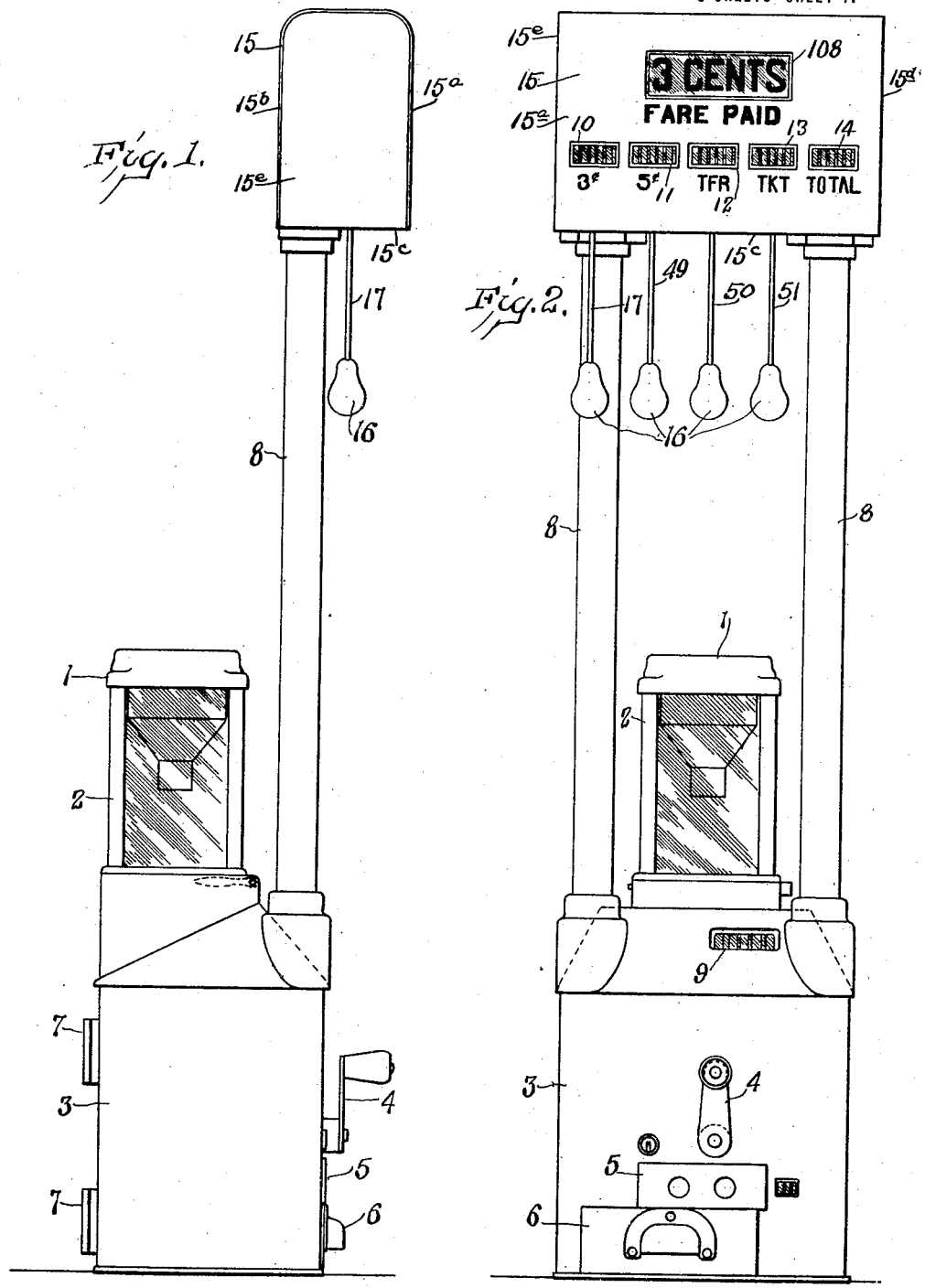

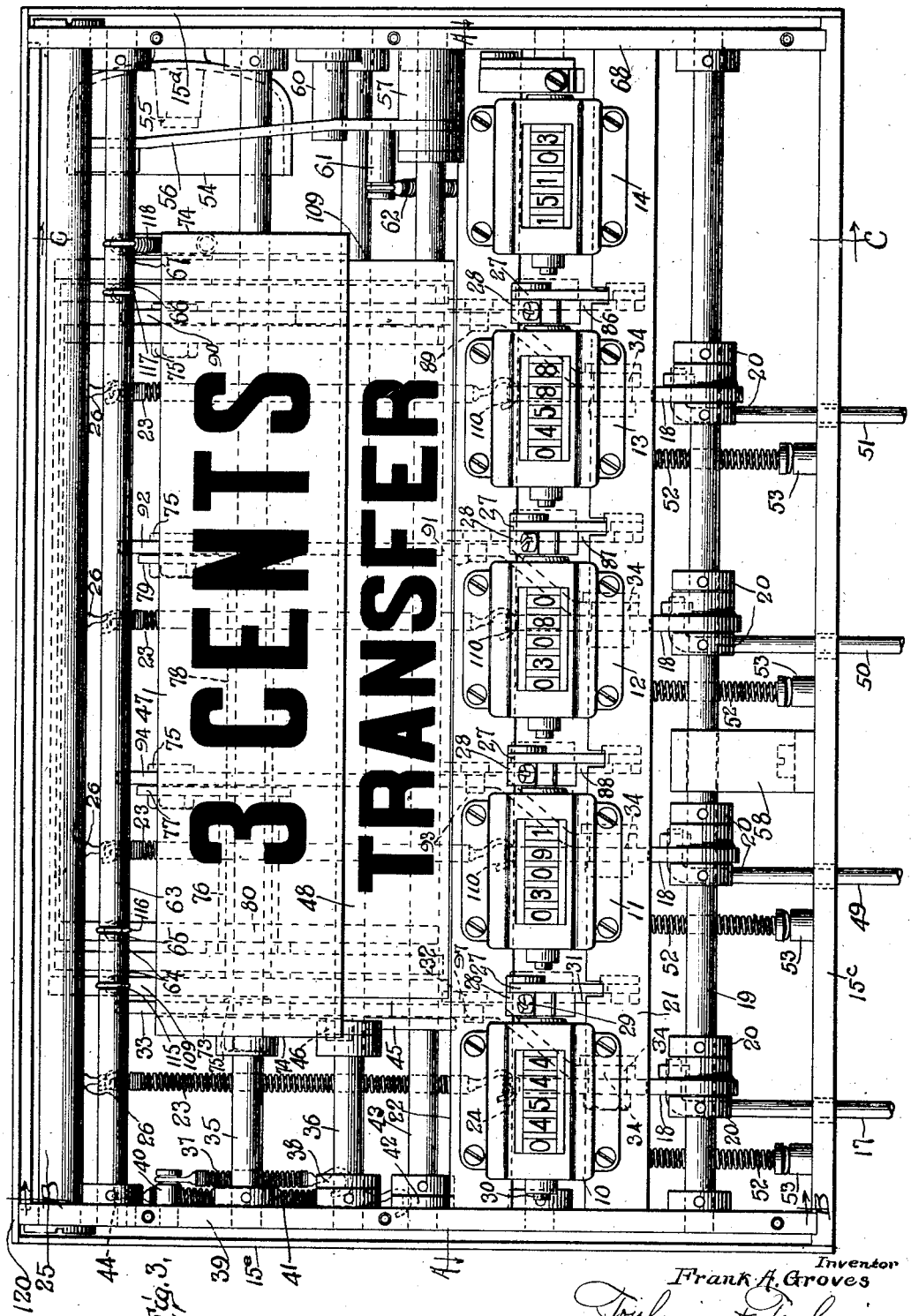

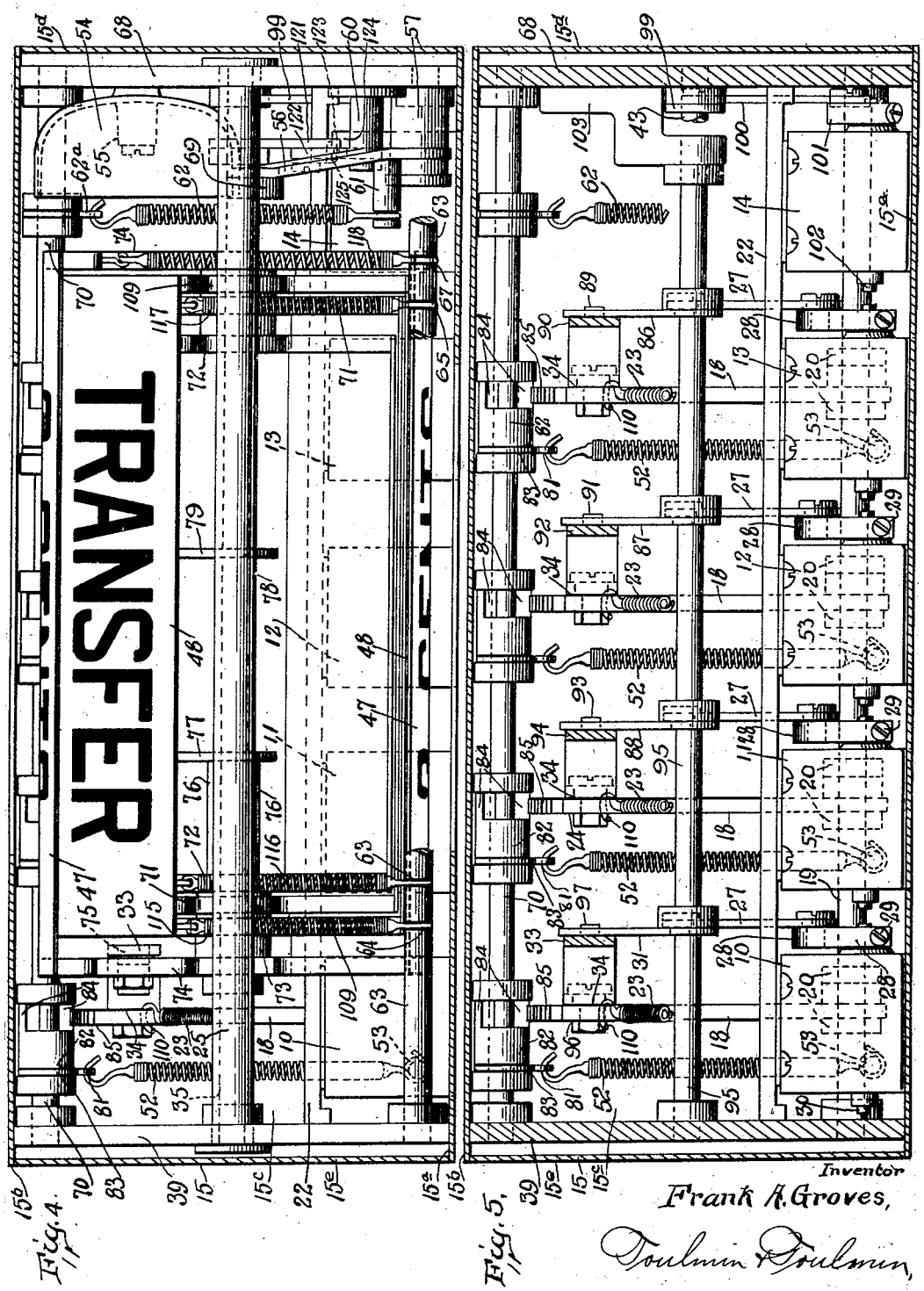

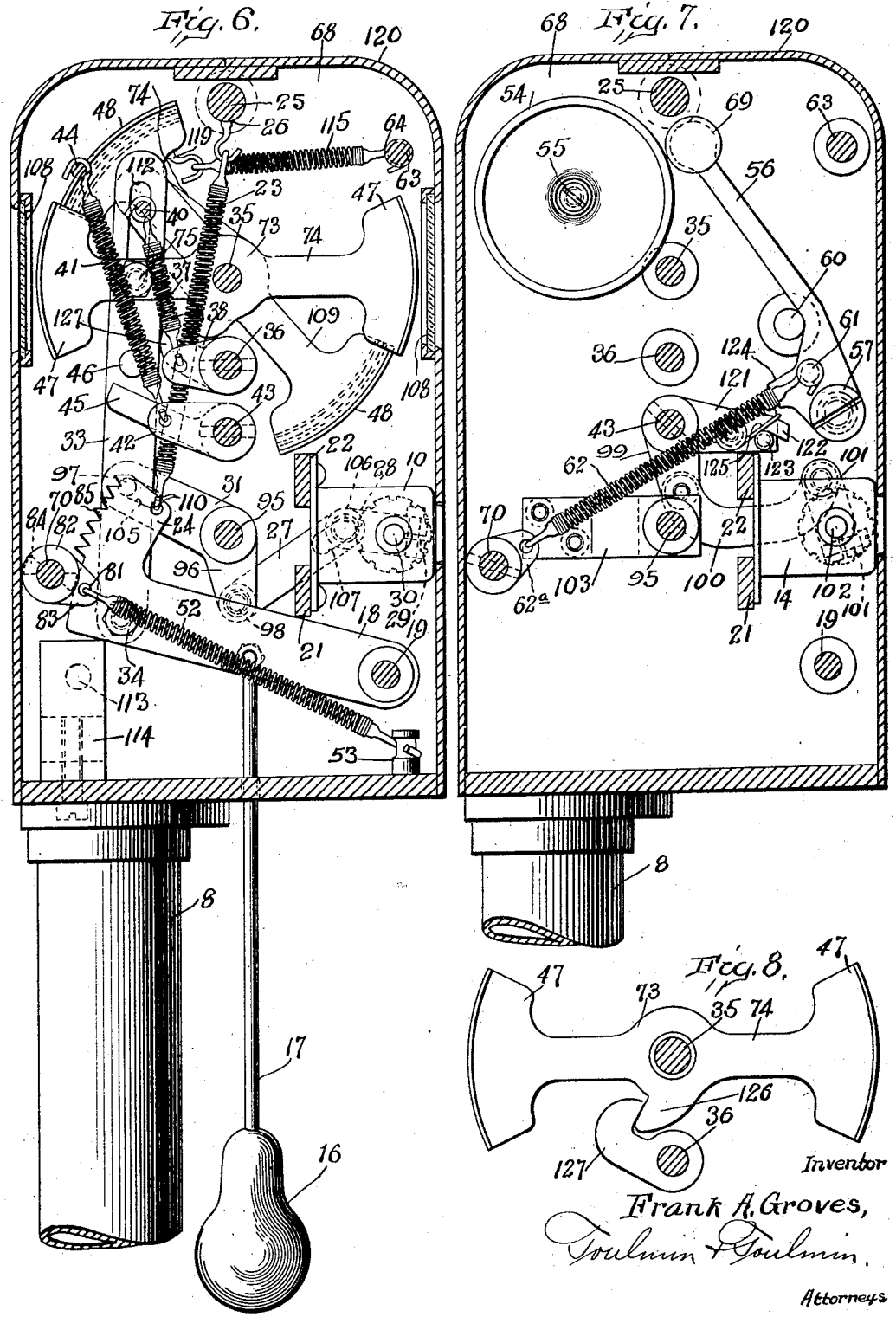

1,265,079.

Patented May 7, 1918.
5 SHEETS—SHEET 5.

Inventor
Frank A. Groves,
Toulmin & Toulmin,
Attorneys

UNITED STATES PATENT OFFICE.

FRANK A. GROVES, OF DAYTON, OHIO, ASSIGNOR TO THE RECORDING AND COMPUTING MACHINES COMPANY, OF DAYTON, OHIO, A CORPORATION OF OHIO.

COLLECTION AND RECORDING OF FARES.

1,265,079.

Specification of Letters Patent.

Patented May 7, 1918.

Application filed August 11, 1917. Serial No. 185,786.

*To all whom it may concern:*

Be it known that I, FRANK A. GROVES, a citizen of the United States, residing at Dayton, in the county of Montgomery and State of Ohio, have invented certain new and useful Improvements in Collection and Recording of Fares, of which the following is a specification, reference being had therein to the accompanying drawing.

My invention relates to the collection and recording of fares or fees for entrance to street cars, places of amusement, etc.

It is the object of my invention to collect and record fares and to record the kinds of fares and the number of passengers.

It is an object of my invention to provide a visible means directly before the passenger of notifying him of the registration of his fare.

It is another object of my invention to provide the combination of means for collecting and recording fares, for giving a visible and audible signal to the passenger of the fact that his fare is recorded and of the particular kind of fare that he deposited, and to separately record the number of individual kinds of fares and the total number of fares by a manual means and to record the amount of fares collected by a mechanical means.

It is my object in particular to provide a visible manual fare indicator displaying the kind of fare deposited by a passenger, at the same time furnishing a double signal of the registration of such fare by the manual means for each passenger, while at the same time providing a mechanical means for counting the fares and recording them.

It is a further object of my invention to provide this visible manual fare indicator, its individual and total counters and the mechanical collection and recording of the fares deposited in order to furnish a check upon the collection of the fares by the conductor or operator through the mechanism and through calling the attention of the passenger to the fact that his fare has been recorded as of a certain kind.

It is a further object of my invention to provide a plurality of separate manually operable means for indicating the specific type of fare by a visible indicator in full view of the passenger, together with an additional recorder of the numbers of any specific kind of fare and a total recorder of all the kinds of fares so deposited.

It is a further object to provide means for preventing more than one manual registration at one time, thus necessitating a separate manual registration for each fare deposited.

In the accompanying drawings:—

Figure 1 is a side elevation of the entire assembly of fare box and indicator;

Fig. 2 is a front elevation of the same;

Fig. 3 is a front elevation of the visible indicator, the front portion of the casing being removed.

Fig. 4 is a top plan view of the visible indicator, with the casing in section;

Fig. 5 is a sectional view, taken on the line A—A of Fig. 3 and looking in the direction of the arrows;

Fig. 6 is a vertical section taken on the line B—B of Fig. 3 and looking in the direction of the arrows;

Fig. 7 is a vertical section taken on the line C—C of Fig. 3 and looking in the direction of the arrows;

Fig. 8 is a detail view of one of the flash fare indicators and its attendant locking mechanism.

Figure 9:
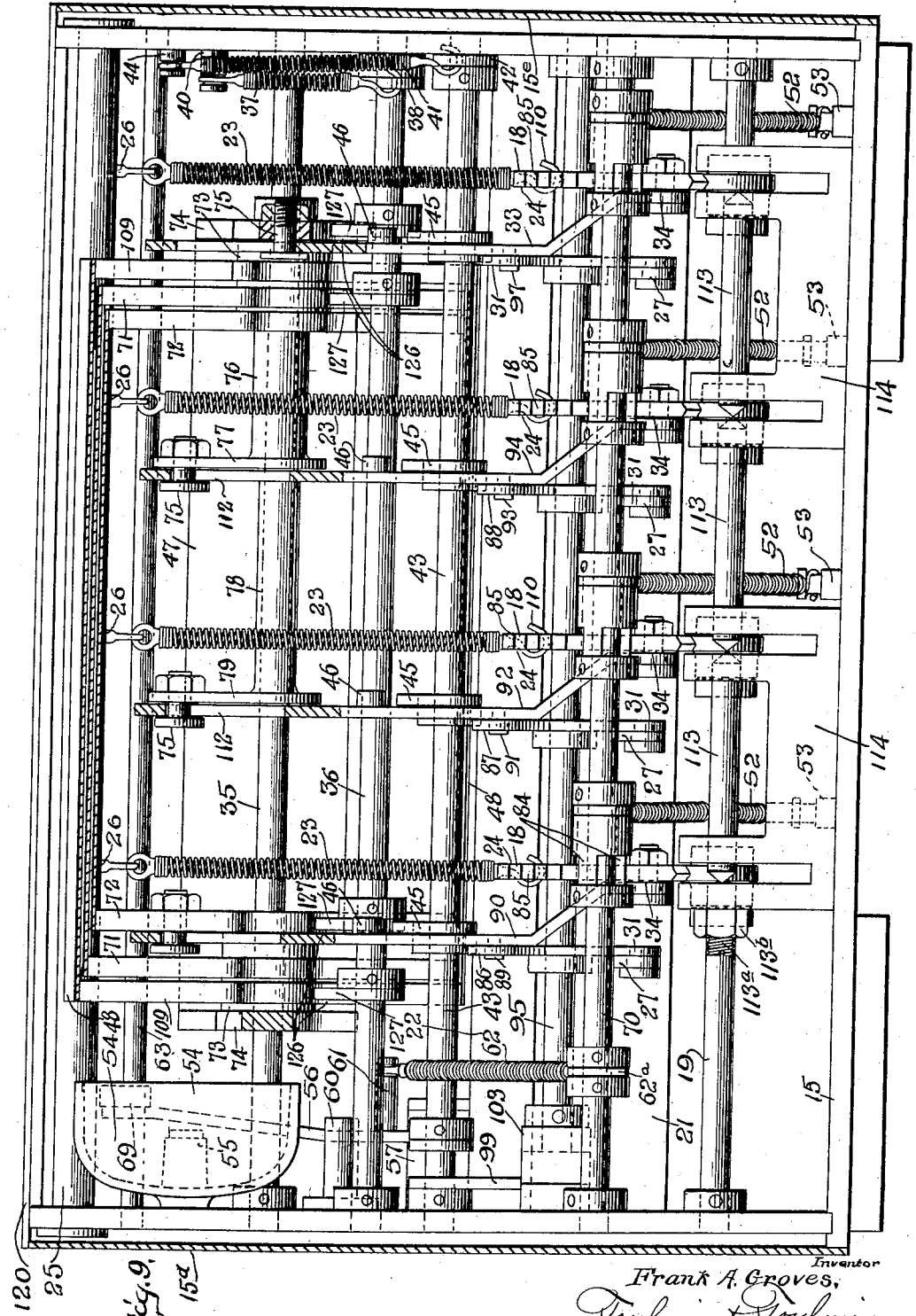
Fig. 9 is a rear elevation of the visible indicator, partly in section.

The fare box and visible indicator illustrated in Fig. 1 and Fig. 2 can be of any customary type. The particular illustration in these views is that of one embraced in the applications of Frank B. Kennedy, filed June 19th, 1913, Ser. No. 774,599 and that of W. I. Ohmer and D. B. Whistler, filed Aug. 31, 1912, Ser. No. 718,001.

*Figs. 1 and 2.*

In the illustrations, 1 denotes the mouth of a fare receptacle into which the fares are deposited, 2 the tower, 3 the box proper, 4 an operating handle for registering the fares deposited, 5 the penny eliminator drawer into which spurious coins are placed through the operation of the handle 4, 6 the drawer into which the fares recorded by the box and the visible indicator are finally deposited and which is unlocked and accessible to the conductor or operator, 7 the brackets constituting the means of attachment of the box to the car or building in which this mechanism is to be used, and 8 the standards which are the means of connection between the fare box proper and the visible indicator. Such an arrangement is preferable as it allows placing the operating mechanism of the fare box within easy reach of the conductor or operator and the visible indicator on sight-level with the passenger and conductor. The counter 9 in the fare box indicates the fares mechanically registered and deposited in the box. The counter 10 indicates the recording of all three cent fares, the counter 11 the recording of all five cent fares, the counter 12 the recording of all transfers, the counter 13 the recording of all tickets and the counter 14 records the total of all fares received and deposited within the fare box 3. The visible indicator 15 is provided with sight openings 108 through which may be seen the fare being registered or recorded, the kind of fare and the total of all fares that have been thus far dropped into the mouth 1 and deposited into the fare box 3. Depending from the visible indicator 15 are the hand grips 16 connected to the mechanism within the indicator by the rods 17, 49, 50 and 51 by which the manual operation of a specific flash, its counter, an audible signal and the total counter is performed. The visible indicator 15 comprises a two part casing, a front section 15ª and a rear section 15ᵇ meeting at the top half-way and supported by a base plate 15ᶜ. The right and left hand side members 15ᵈ and 15ᵉ complete the box like structure inclosing and protecting the mechanism comprising the visible indicator.

*Fig. 3.*

This is a front elevation, with the front portion of the casing or cover removed, of the assembled visible indicator mechanism. The connecting rods 17, 49, 50 and 51 enter suitable apertures in the base plate 15ᶜ and are suitably secured to master operating levers 18. The front end of these master levers swings freely on the shaft 19 being held from any sidewise motion by the collars 20 which are located one on either side of this master lever and held rigidly on said shaft 19 by suitable dowel pins. These master levers are normally positioned at an incline, from the front to the rear, being kept in such position by suitable springs 23. The individual recording counters 10, 11, 12, 13 and the total recording counter 14 are held in their fixed relation by the supporting members 21 and 22, these members being rigidly secured to the end frames 39 and 68.

The general scheme of this entire visible indicator mechanism is to pull down hand grip 16 and the connecting rod 17, thus operating the master lever 18 and in turn through suitable intermediate mechanism, to be hereinafter described, operating the respective counter or recorder mechanism which is connected to the particular hand grip and also at the same time operating the flash which will indicate the kind of fare being registered and will register the fare on the total indicator or recording mechanism, at the same time operating the audible signal.

In order to carry out or perform this object the master lever 18 is normally kept suspended at its rear in its uppermost position by the spring 23 which is attached to its L-shaped portion 24 and at its other end to the horizontal shaft 25 at 26. Certain intermediate levers which will be more fully described in Fig. 6 serve to communicate motion to the lever 27 which is pivotally connected to the lever 28. The jaw and set screw mechanism 29, controlled by the lever 28, is clamped rigidly to the shaft 30 of the indicator or recording mechanism. The other end of this lever 27 is connected to the lower end of a bell crank 31 while its upper end 32 is connected to the vertical shifting lever 33. The lower end of this lever 33 is connected to the master operating lever 18 at a point 34. The shaft 35 pivotally supports the flashes. The shaft 36 has rigidly secured thereon a series of hooks to lock any one of the flashes in position for visible indication through the aperture in the casing. The spring 37 is hooked to a projecting arm 38 attached to the shaft 36 and normally holds this arm elevated at its outer end so that the lock or projecting hooked finger, of which there are a series, one to each flash, will remain in engagement with its corresponding hook attached to the flash, thus locking the flash in any desired visible position after the handle 17 and accompanying mechanism has been moved to so display the flash. When the hook is unlocked to move the flash out of the line of vision to bring into display a new flash the hooks are pulled out of engagement with one another and the spring 37 is extended. 37 is attached to the main frame 39 by the stud 40. A spring 41 is attached to an extending arm 42 on the shaft 43. This spring is also attached to the main frame 39 by a stud 44. On the shaft 43 are a series of fingers projecting at right angles to and away from the point of view of the observer in Fig. 3. One of these fingers is marked 45. The vertical lever 33 has upon it a lug 46, shown in dotted lines, which moves downwardly and comes in contact with the upper end of 45, thereby rotating the shaft 43. To each shaft there is apportioned a similar mechanism with the lugs 46 placed on the respective levers 33, 94, 92 and 90, depending upon the particular flash to which they are connected. This is done in order to provide a means of successively operating the various flashes without conflict with one another, as one is thrown out of view and another is thrown into view. 47 is the flash exhibiting the three cent fare and 48 is the flash exhibiting the transfer. In the position shown in Fig. 3, the 3 cent flash would be visible to the passenger and conductor when the cover 15ª is on the machine through the sight opening 108, as that is the fare which has just been registered. The transfer fare has been registered just previously to the three cent fare. The hand grip 16 and connecting rod 17 to the extreme left hand operates the three cent fare, the next rod reading from left to right and known as 49 operates the five cent fare, the rod 50 operates the transfer and the rod 51 operates the ticket fare. The mechanism connected to the rods 49, 50 and 51, respectively, is the same as that described in connection with the hand grip 16 and connecting rod 17. The spring 52 fastened to the studs 53 on the base plate 15ᶜ at one end and at its other end to a member to be described hereafter serves the purpose of keeping in predetermined position certain locking mechanism more fully described in connection with other figures plainly illustrated.

Referring to the right hand side of the figure, 54 is a bell for the audible signal mounted on the stud 55 projecting from the side frame 68. The clapper arm 56 is mounted upon a stud 57 which is attached to the side frame 68 and at right angles thereto. The mechanism for operating the audible signal and the total counter just beneath it, designated as 14, will be more fully described in connection with Fig. 7. 58 is a standard acting as a support for the shaft 19 and has a bearing in which it turns. The stop 60 lies in the path of the clapper arm 56. To this clapper arm 56 is attached the stud 61 to which is fastened a spring 62 holding the clapper arm normally against the stop 60. The shaft 63 to which are attached the springs 115, 116 and 117 and 118 respectively hold the flashes in their inoperative positions. When a flash is displayed its particular spring is extended. The point of connection of these springs with the shaft 63 is shown at 64 where the spring for the transfer flash is attached. 65 is the point of attachment to 63 of the spring for the ticket flash. 66 is the point of attachment to 63 for the spring of the five cent flash and 67 is the point of attachment to 63 for the three cent flash.

*Fig. 4.*

Referring to Fig. 4, which is a top plan view, with the cover in section, of the visible signal and audible signal mechanism, reading from the top of the figure downward, 68 is the right hand end of the frame, 54 is the bell of the audible signal, 55 the stud on which it is fastened, and 69 the hammer on the clapper arm 56. 61 is the stud on the clapper arm, 62 is the spring attached to it at one end and to shaft 70 at the other end. 57 is the stud upon which the lower end of the clapper arm 56 is pivoted, 60 is the stud against which 56 rests. 35 is the main shaft upon which are pivoted the several flashes. 48 indicates the transfer flash. This transfer flash would not be visible when the cover is on. The machine is in position where the three cent flash is visible. The upper edge and portion of the side of this three cent flash can be seen at 47. 71 indicates the supporting arm of the five cent flash and 72 indicates the supporting arm of the ticket flash. On the shaft 35 turns the disk 73 which carries the supporting arm 74 of the three cent flash. On the supporting arm 74 is placed a stud 75 which travels in a slot in the upright lever 33. When the hand grip 16 is pulled to its lowermost position, as it progresses to that position the upper end of the slot in the lever 33 engages the stud 75 and pulls the flash of the three cent fare into visible position. 76 is a sleeve turning loosely on the shaft 35 and has attached to it at one end the arm 77 with a stud and slotted lever construction similar to that just described. This slotted lever construction more fully described later permits the slotted lever to return to its initial position after having drawn the flash into locked position so that it will be visible and remain so until another kind of fare is registered. 78 is a sleeve turning loosely on the shaft 35 with the lever 79 at one end coöperating with a similar slotted lever to throw its transfer flash into visible position.

Projecting upwardly from the bottom of the base plate 15ᶜ is a stud 53 to which the spring 52 is attached and at the other end this spring is attached at 81 to a sleeve 82 turning loosely on the shaft 70. This spring is hooked into a projecting lever 83 extending downwardly a short distance from the sleeve 82. This sleeve 82 has attached to it a double pawl 84, which serves as an arrester by engaging the teeth 85 on the end of the master lever 18 and not permitting this lever to move upward after having once started downward until the teeth clear the pawl entirely. The spring holds the pawl against movement until this clearance has been effected. Upon the clearance being completed the spring returns the pawl to its initial position. The prime object of this is to prevent the operator from starting to register a particular fare and then shifting over when the registration is partially completed before the passenger can observe it and actually register a lower fare, thereby gaining in his accounts. There is certain other mechanism coöperating with this which prevents the registration of two different kinds of fares at the same time. 23 is the spring attached at its lower end to the lever 18 and at its upper end to the shaft 25.

Fig. 5.

Fig. 5 is a horizontal sectional view on the plane indicated by the line A A of Fig. 3. In this Fig. 5, 68 is the right hand end wall. The shaft 95 carries on it a series of bell cranks 86, 87, 88 and 31. 86 is attached to the vertical lever 90 by a pin 89 which travels in a slot in 86. The slot is not shown in this view. Likewise, 87 coöperates with the lever 92 by the pin 91. 88 operates with the lever 94 and pin 93 and 31 operates with 33 and pin 97. The lever 31 is pivotally fastened at 98 to the lever 96. 23 indicates the spring which is attached to the lever 18 and normally holds it elevated. 84, 85, 83, 82, 81, 52 and 53 have been described in dealing with Fig. 4 and are the same in this view. The other arm 96 of the bell crank 31 extends at approximately right angles from the one shown in this figure and as it extends downward it is hidden beneath the shaft 95. The lower end 96 of this bell crank is pivotally attached to the lever 27 which, at its other end, is in turn pivotally attached to the lever 28 which is fastened to the main shaft 30 of the counter. Thus, when 18 is pulled downward 96 is pulled with it, pulling 97 which moves 27 in a direction at right angles to the original motion, thereby imparting a swinging motion to the lever or crank 28 around the axis 30, advancing the counter a requisite distance to register a single fare. Like operations take place when any one of the other groups of mechanism are actuated by their respective handles. 39 is the left hand end wall.

99 indicates a downwardly projecting lever, the extension of which is hidden because of the point of view in Fig. 5 and to this downwardly projecting lever is connected a cross lever 100 which is pivotally connected to 99 at one end and pivotally connected to a crank 101 at the other end. This crank is mounted on the main shaft 102 of the total counter. Upon any one of the individual counters being actuated, the total counter is also actuated by the movement of the lever 99 swinging to the right as you view Fig. 5, shifting 100 to the right and moving 101 toward the right on its axis 102.

103 is a bracket extending from the side frame 68 and acting as a bearing for the end of the shaft 95. This shaft ends short of the right side frame 68 and is journaled in the bracket 103, so as to allow free swinging motion to the downwardly projecting lever 99 in its function of operating the total record counter on each fare registration.

Fig. 6.

Fig. 6 is a vertical sectional view of the indicator mechanism showing in detail the mechanism for a single fare which is typical of the other single fare mechanisms.

16 is the hand grip, 17 is the rod connection attached to the hand grip 16 and pivotally connected to the lever 18. The lever 18 is pivoted at one end on the shaft 19 and at the other end has an L-shaped extension 24, the outer periphery of which is partially serrated at 85 to form a rack. This rack occupies a semicircular position. 84, shown in dotted lines, is a pawl coöperating with this rack, as explained above, to prevent it from being moved in an upward direction after having once started on a downward direction until the rack entirely clears this pawl and the pawl is returned to its initial position by the spring 52 attached at 53 to the frame and at 81 and 83 to the member 82 which carries the pawl 84. Pivotally connected to the lever 18 at 34 are the upright levers 33, 94, 92 and 90 on which are the pins 97, 93, 91 and 89 traveling in the slots 105 in the bell cranks 31, 88, 87 and 86. The bell crank 31 rotates loosely on the shaft 95. The lower end of the bell crank 31 is pivotally connected to the lever 27 at 98. 27 is connected by a pin 106 and slot 107 construction to the crank 28 which is fastened to the shaft 30 of the counter. The pin 106 travels in the slot 107 in the lever 27. 22 and 21 are the supports, shown in section, which support the counters, 10, 11, 12, 13 and 14, both individual and total. 108 is the window through which a particular flash is displayed. 47 is the three cent flash being displayed in the window in Fig. 6 and 48 is the transfer flash which appears on the outside just below it to the right and just above it to the left. 73 and 74 constitute the supporting sleeve and cross arm which supports the flash for the three cent fare. 109 is the cross arm supporting the transfer flash. 35 is the shaft on which these flashes turn. 23 is the spring which keeps normally elevated the arms 18 and is attached to the arm 18 by a hook and eye construction 110. 36 is the catch shaft carrying the catch for each flash to hold it in position when a fare has been registered until a fare of another kind is registered. 43 is the shaft upon which the levers 45 and similar levers for each flash are situated. This lever 45 is depressed by coming in contact with the pins 46 on the vertical levers 33, 90, 92 and 94. 75 is a stud on the supporting arm 74 of the three cent fare flash which travels in the slot 112. 44 is the stud, here shown in section, to which the spring 41 is attached to the lever 42. 40 is the stud, here shown in section, to which is attached the spring 37 at one of its ends and at its other end to the lever 38. 113 is the shifting shaft which prevents the operation of more than one individual indicating and flash mechanism at one time. 114 is its support. Contained in one of the supporting members 114 is an adjusting means for regulating the travel of the shifting shaft 113. As here shown (Fig. 9) this regulating means comprises a threaded portion 113$^a$ adapted to be moved forward and backward to regulate the travel of shaft 113 and to be held in a desired position by the lock nut 113$^b$. 115 (Fig. 6) is the spring attached at one end to the transfer flash 48 at 119 and at the other end at 64 to the shaft 63 which is shown in section.

In this figure the end cover of the casing has been removed. The cover itself is shown, in section, at 120 and is of two part construction.

(*Fig. 7.*)

Fig. 7 is a vertical section on the line C C of Fig. 3.

54 is the bell, 69 the head on the clapper arm 56. 57 is a stud projecting from the frame member 68 upon which it freely rotates, 60 another stud projecting from the frame member 68 and adapted to lie in the path of the clapper arm 56 against which it stops. Projecting from the clapper arm 56 is a stud 61 about which one end of the spring 62 is secured, said spring acting on the clapper arm 56, tending to keep it against the stud 60. The other end of the spring 62 is adapted to be carried by a rotatable member 62$^a$ on the shaft 70. The bell is carried on the stud 55. 35 is the shaft on which the flashes turn. 36 is the catch shaft and 43 is the shaft carrying the operating lever 99 for the total counter. This operating lever 99 is pivoted to the cross lever 100 and the other end of 100 is pivoted to the crank 101 on the countershaft 102 which operates the total counter. On the shaft 43 is also attached the arm 121 which has the pawl 122 pivoted upon it. The under side of the pawl rests upon the stud 123 carried by the arm 121. When the shaft 43 is turned the arm 121 lifts and the nose of the pawl 122 engages with the lug 124 on the clapper arm 56, thereby positively lifting the arm 56 from out of engagement with its stop 60 until the nose of the pawl 122 passes by the projection 124 and allows the clapper arm 56 and its head 69 to return to its original position to rest against 60 and at the same time at the limit of its motion tapping the gong 55 with its head 69, sounding the audible signal. Upon the return movement of 121 the spring-pressed pawl 122 held against 123 by a spring 125 is allowed to pass by 124 by reason of the fact that it is merely spring-pressed against 123 and after passing 124 and sliding over that projection it is returned by the spring to its normal position at rest on 123. 21 and 22, in section, are the supports for the total counter. 25 is the shaft in section which supports such springs as 23, (spring not shown in this figure); 19 is the shaft upon which certain mechanism is pivoted as explained heretofore.

(*Fig. 8.*)

Fig. 8 is a detail view of the cross arm 74 carrying the flash 47 with its catch 126 on the bearing 73. A coöperating catch 127 is carried by the shaft 36. This detail is typical of the other flash arms. 35 is the shaft on which the flash arms turn.

While I have shown and described one embodiment of the invention it will be understood that the same has been chosen for purposes of illustration only and that I do not desire to be limited to the details of construction shown and described, for obvious modifications will occur to a person skilled in the art.

Having thus fully described my invention, what I claim as new and desire to secure by Letters Patent, is:—

1. In an indicator, a frame, a transverse shaft having pivoted thereon a series of levers, means for holding each of said levers in their inoperative position, individual means to draw each of said levers into their operative position, a vertically extending lever pivoted at the outer end of the first-mentioned lever and loosely connected to a flash by a stud on said flash and a slot in said lever, a second transverse shaft on which a series of flashes are mounted, each of which is thus operatively connected to its respective lever and operating means, a third transverse shaft carrying affixed to it a series of bell crank levers, one end of each of which is loosely pinned through a pin and slot to its respective second-mentioned lever and on the other end of each of which lever is an individual counter corresponding to the respective flash with which it is in operative relationship, a fourth transverse shaft on which is located a series of levers adapted to be operated by the contact with the outer end of each lever with the stud on the second-mentioned lever when the second-mentioned lever is operated, thus operating a total counter and an audible signal, means operatively connected with said fourth-mentioned transverse shaft to operate said total counter and said audible signal, a fifth transverse shaft, a series of hooks on said transverse shaft, each of which is adapted to engage a corresponding hook on its respective flash to hold said flash in operative position, a sixth transverse shaft on which said flashes are pivotally mounted, and resilient means to hold said flashes, respectively, in their inoperative positions, whereby when the respective operative means is actuated its respective flash will be brought into view, held in place, and the individual and total counters as well as the audible signal operated.

2. In an indicator, a frame, a transverse shaft, a series of levers pivoted thereon, an arm on the outer end of each of said levers extending transversely to its longitudinal axis, a ratchet on the outer periphery of each of said arms, a transverse shaft, a series of pawls, each one of which coöperates with its respective ratchet, resilient means to maintain each of said pawls in their normal positions and to return said pawls to their normal positions after said ratchet has passed its respective pawl, means to operate its respective flash attached to each lever, means to operate its respective individual counter attached to said lever, and means to operate the total counter through said lever, and means to operate an audible signal through said lever.

3. In an indicator, a frame, a plurality of levers pivoted thereto, means to actuate said levers, means attached to each of said levers to display a flash, means to actuate an individual counter, means to actuate a total counter, means to actuate an audible signal, a plurality of apertures into each of which the outer end of one of said levers moves upon its respective operation, a plurality of shiftable means, one less in number than the number of apertures adapted to block the entrance to all of said apertures save one at a time, whereby when one lever moves into one aperture the blocking means will close the other apertures and prevent the other levers from entering into their respective apertures.

4. In an indicator, a frame, a plurality of levers pivoted thereto, means to actuate said levers, means attached to each of said levers to display a flash, means to actuate an individual counter, means to actuate a total counter, a plurality of apertures into each of which the outer end of one of said levers moves upon its respective operation, a plurality of shiftable means, one less in number than the number of apertures adapted to block the entrance to all of said apertures save one at a time, whereby when one lever moves into one aperture the blocking means will close the other apertures and prevent the other levers from entering into their respective apertures.

5. In an indicator, a frame, a plurality of levers pivoted thereto, means to actuate said levers, means attached to each of said levers to display a flash, means to hold a respective flash in position until a flash of another kind is operated, means to actuate an individual counter, means to actuate a total counter, means to actuate an audible signal, a plurality of apertures into each of which the outer end of one of said levers moves upon its respective operation, a plurality of shiftable means, one less in number than the number of apertures adapted to block the entrance to all of said apertures save one at a time, whereby when one lever moves into one aperture the blocking means will close the other apertures and prevent the other levers from entering into their respective apertures.

6. In an indicator, a frame, a plurality of flashes of different denomination mounted on a transverse shaft therein, a pair of arms to each flash, a display plate attached to the outer end of each of said arms, whereby when said flash is brought into operative position its display plates, one on each side, can be seen one on each side of the indicator.

7. In an indicator, a frame, a shaft fixed therein, a plurality of flashes mounted on said shaft, each of said flashes having a pair of flash plates adapted for display one on each side of said indicator when the flash is brought into its operative position, a transverse arm at each end of each flash to support the respective ends of the display plates, means on one of said arms of each flash to engage a coöperating means on another shaft in said frame to hold said flash in its display position when it has been brought thereto, actuating means to bring each of said flashes into their operative positions, and means connected to said actuating means to operate an individual counter corresponding in denomination to its respective flash.

8. In an indicator, a frame, a shaft fixed therein, a plurality of flashes mounted on said shaft, each of said flashes having a pair of flash plates adapted for display one on each side of said indicator when the flash is brought into its operative position, a transverse arm at each end of each flash to support the respective ends of the display plates, means on one of said arms of each flash to engage a coöperating means on another shaft in said frame to hold said flash in its display position when it has been brought thereto, actuating means to bring each of said flashes into their operative positions, means connected to said actuating means to operate an individual counter corresponding in denomination to its respective flash, and means to actuate a total counter upon the operation of any individual flash and counter.

9. In a fare recorder, the combination, with an operating lever and a hand operated device for actuating said lever, of a spring retaining said lever against movement, a link connected to said lever and having a slot therein, a pivoted flash having an element riding in said slot in said link, a spring normally retaining said flash in concealing position, a latch holding said flash in viewing position, and means carried by said link for disabling said latch, said means having a lost motion connection such that part of the movement of the link occurs before the latch disabling movement begins.

10. In a fare recorder, the combination, with a plurality of operating levers and hand operated devices for actuating said levers, of a plurality of pivoted flashes, one for each operating lever, with springs normally holding said flashes in concealing position, links connected to said operating levers and having slots therein, pins carried by said flashes and riding in said slots, latches for holding said flashes in viewing position, a shaft on which said latches are all fast, and arms fast in said shaft and projecting into the path of elements carried by said links, said elements being spaced from said arms when said links are in normal position.

11. In a fare recorder, the combination, with a plurality of operating levers and hand actuated devices for operating said levers, of links connected to said levers, a plurality of counters, devices connecting said counters to said links, including bell crank levers having slot and pin connections to said links, and other links connected to said bell crank levers and to elements of said counters, a total counter, a counter operating shaft, a plurality of arms fast on said shaft and positioned in the path of projections carried by said first links.

In testimony whereof, I affix my signature.

FRANK A. GROVES.

Copies of this patent may be obtained for five cents each, by addressing the "Commissioner of Patents, Washington, D. C."